No. 827,915. PATENTED AUG. 7, 1906.
I. KITSEE.
ELECTRIC BATTERY.
APPLICATION FILED JUNE 12, 1901. RENEWED MAY 3, 1905.
2 SHEETS—SHEET 1.
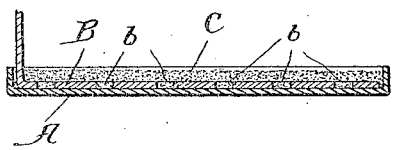
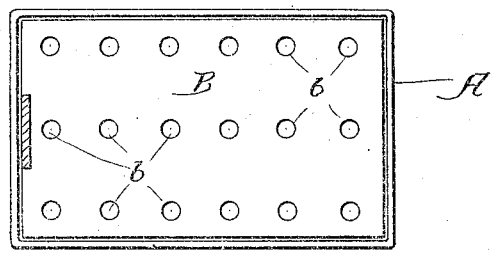
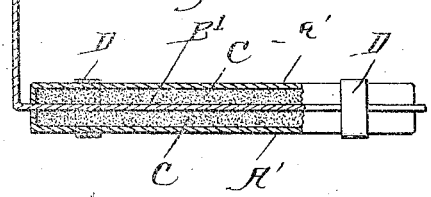
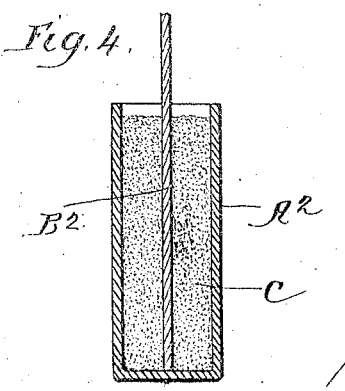
WITNESSES:
H. B. Hallock.
E. R. Stilley
INVENTOR No. 827,915. PATENTED AUG. 7, 1906.
I. KITSEE.
ELECTRIC BATTERY.
APPLICATION FILED JUNE 12, 1901. RENEWED MAY 3, 1905.

2 SHEETS—SHEET 2.

WITNESSES:

INVENTOR

UNITED STATES PATENT OFFICE.

ISIDOR KITSEE, OF PHILADELPHIA, PENNSYLVANIA.

ELECTRIC BATTERY.

No. 827,915.　　　　　　Specification of Letters Patent.　　　　　Patented Aug. 7, 1906.

Application filed June 12, 1901. Renewed May 3, 1905. Serial No. 258,693.

*To all whom it may concern:*

Be it known that I, ISIDOR KITSEE, of the city and county of Philadelphia, State of Pennsylvania, have invented certain new and useful Improvements in Electric Batteries, (Case No. 130,) of which the following is a specification.

My invention relates to an improvement in electrodes for electric cells.

The object of my invention is to produce an electrode for electric cells, primary as well as secondary, adapted to produce the necessary depolarization without any depolarizing material being present in the electrolyte or without any high oxid being present in the electrode itself.

The chemical action due to the dissolving of the positive electrode in primary cells or due to the change from the metallic state to the state of a salt compound of the active material in secondary cells is well understood, and it suffices to say that the hydrogen liberated through the dissolving of the electrode or the change from the metallic state to the salt compound of the active material tends to polarize the electrode of the opposite sign.

In primary cells depolarizing material—material capable of giving out oxygen—is therefore employed in conjunction with the electrolyte to counteract or neutralize the liberated hydrogen, and in secondary batteries the electrode is provided with a high oxid capable of combining with the hydrogen liberated as soon as the same strikes the surface of said electrode.

It is the aim of my invention to dispense with the depolarizing material usually employed in primary or secondary cells.

The action of platinum in bringing about the condensation of gases through contact action on its surface was taken advantage of in the earlier days of electrical science; but on account of what seemed to be unsurmountable difficulties the practical application was abandoned.

In another application, filed May 23, 1901, under Serial No. 61,646, I have described an electrode consisting of carbon, the interstices of which are lined with finely-divided platinum, and this my invention has more special reference to electrodes provided with active material consisting of platinized charcoal or other finely-divided carbon.

Figure 5:
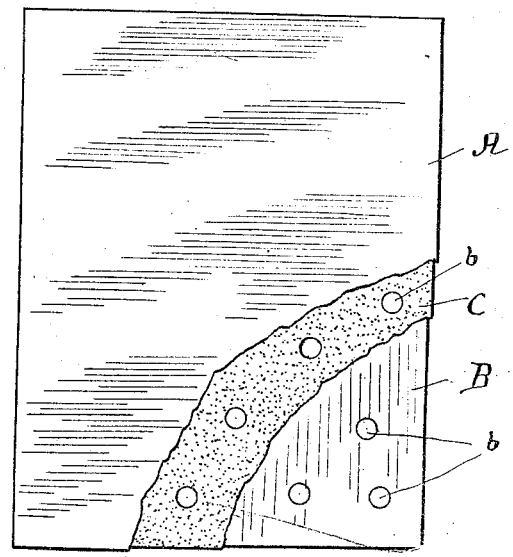
Figure 6:
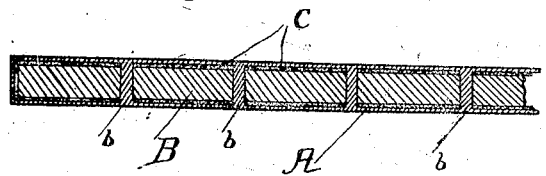

Referring to the drawings, Figure 1 is a longitudinal section of an electrode embodying my invention. Fig. 2 is a plan view of Fig. 1. Fig. 3 is a partly-sectional and partly edge elevation of a box filled with the active material, the conductor passing through the center of said box. Fig. 4 is a vertical section of a modification of Fig. 3. Fig. 5 is an elevational partially-fragmental view of a modification of my invention. Fig. 6 is a sectional elevation through the electrode.

In Fig. 1, A is the support; B, the conductor; $b$, the perforations in said conductor; C, the active material, consisting of platinized carbon in the divided state.

The support is preferably non-conducting and may consist of hard rubber or a like material; but where it is desired to utilize the lower surface as well as the upper surface of the conductor the support A shall consist of porous material—such, for instance, as is used in the usual porous cups. The conductor consists of carbon, or, as carbon is easily broken and contact with same cannot readily be made, the conductor may consist, where the electrolyte is diluted acid, of lead, the surface of which is preferably oxidized—that is, lead which was connected in an electric cell to the positive pole of the charging-circuit.

In Fig. 3, A' A' are the supports in the shape of two half-boxes held together by the band D. B' is the conductor. In this figure the conductor is not perforated and the support has to be of porous material. The construction as shown in this figure is in some cases preferable to the construction of Fig. 1, for the reason that the active material is entirely inclosed and cannot easily be injured. The conductor may consist of platinum or other suitable conducting material.

In Fig. 4, $A^2$ is a porous cup, the manufacture of which does not need further explanation, as porous cups are well known in electric batteries. In this cup is placed the conductor $B^2$, the shape of which has to vary with the shape of the cup itself, and around this cup is packed the active material C, consisting of platinized carbon.

In Figs. 5 and 6, B is the conductor proper, which conductor, as said above, may consist of carbon or other suitable metal. This conductor is provided with the perforations $b$, the active material C, and the porous envelop A.

In preparing the electrode according to the construction of Fig. 1 the conductor is placed in the support in a manner so as not to be easily disturbed and, if it is necessary, fastened to said support. On the conductor is then placed the platinized charcoal, so that the same shall fill the holes of said conductor and shall cover the surface of the same to a thickness of about one-sixteenth of an inch.

In constructing the electrode as illustrated in Fig. 3 each half of the porous support is first filled with the active material. The conductor is then placed between the two halves, and these two halves are then clamped together or otherwise secured to each other with the aid of rubber bands. In making this electrode care shall be taken that the active material shall come in contact with the conductor, and it is preferred that the active material shall be somewhat under pressure, so that when expanding in the liquid it shall tightly press on said conductor.

The electrode made according to Figs. 5 and 6 differs in the mode of making entirely from the electrode described above. Instead of having the active material independent from the conductor proper and instead of providing the active material with a carrier I make use of the process of platinizing the carbon; but, as clearly set forth in another application, filed May 23, 1901, Serial No. 61,646, the great disadvantage of platinized carbon is that the finely-divided platinum on the surface of the same usually disintegrates and falls to the bottom of the same and that the least shaking of the cell results in the disintegration of these particles. To overcome this difficulty, I have provided the platinized conductor with an outer envelop.

In my experiments I have found that the best results are obtained if this outer envelop consists of plaster-of-paris, and that this plaster-of-paris protector shall not fall from the conductor I provide the conductor with perforations.

The best manner to provide the conductor with the plaster-of-paris is as follows: The edges of the conductor are provided with a rim of about one-sixteenth of an inch in thickness, the conductor is laid on the flat surface, and the plaster-of-paris poured on the upper surface of the same. After the plaster-of-paris has set the conductor is turned with the lower side upward, and this side is provided with the coating of plaster-of-paris in the same manner as the other side.

The platinizing of the carbon or other conductor is best accomplished in the following manner: In a solution consisting of nitric and hydrochloric acid and dissolved platinum the conductor is connected to the negative pole of the charging-circuit, and a platinum conductor is connected to the positive pole of the same. In a short time the surface of the conductor to be used as an electrode is covered with a film of finely-divided platinum—that is, platinum-black.

The above process may differ in so far that a chlorid salt is dissolved in diluted sulfuric acid to be used as the electrolyte.

I have described and illustrated the electrode in Figs. 1, 2, 3, and 4 as to consist of three elements—a support, a conductor, and active material in the shape of finely-divided carbon platinized; but if only one surface of the conductor is to be used and space or weight is of no consequence then the conductor itself may be made in the shape of a tray and be its own support. In this case the active material is contained in the tray formed of the conductor, and the conductor and support are therefore one.

Having now described my invention, what I claim as new, and desire to secure by Letters Patent, is—

1. An electrode for an electric cell consisting of the conductor proper, active material in contact with said conductor, said active material consisting of platinized charcoal and means to keep said active material in contact with said conductor.

2. In an electrode for an electric cell provided with active material consisting of platinized charcoal, means to preserve the contact between said active material and a conductor, said means consisting of a non-conducting but porous material.

3. The combination to form an electrode for electric batteries, of a conductor, finely-divided platinum on the surface of said conductor, and an envelop of plaster-of-paris on the outer surface of said conductor.

4. The combination to form an electrode for electric batteries, of a conductor provided with holes or perforations, finely-divided platinum on the surface of said conductor, and a plaster-of-paris coating on the outer surfaces of said finely-divided platinum, the two surfaces of plaster-of-paris united through said holes or perforations.

5. An electrode for electric batteries consisting of a conductor, finely-divided platinum on the surface of same, in combination with an outer envelop of plaster-of-paris.

In testimony whereof I hereby sign my name, in the presence of two subscribing witnesses, this 11th day of June, 1901.

ISIDOR KITSEE.

Witnesses:
E. R. STILLEY,
W. B. ELDRIDGE.